April 20, 1926.

L. L. EDMUNDS ET AL 1,581,430

CONTROL GATE

Filed May 18, 1925

INVENTORS.
Louis L. Edmunds.
John Anderson.
BY Dewey, Strong, Townsend & Loftus
ATTORNEY.

Patented Apr. 20, 1926.

1,581,430

UNITED STATES PATENT OFFICE.

LOUIS L. EDMUNDS AND JOHN C. ANDERSEN, OF CROCKETT, CALIFORNIA.

CONTROL GATE.

Application filed May 18, 1925. Serial No. 31,247.

*To all whom it may concern:*

Be it known that we, LOUIS L. EDMUNDS and JOHN C. ANDERSEN, citizens of the United States, residing at Crockett, county of Contra Costa, and State of California, have invented new and useful Improvements in Control Gates, of which the following is a specification.

This invention relates to a control gate and particularly pertains to a valve mechanism for the control of bulk granular material.

The principal object of the present invention is to provide a gate valve structure by which the flow of bulk granular material may be readily regulated or completely interrupted as desired, and also by which the flow of material may be diverted from one passageway to another.

The present invention contemplates the use of a substantially cylindrical valve housing interposed at a point in the length of a chute through which granular material is flowing, and within which housing a segmental arcuate valve member is mounted to be operated by means disposed exterior of the housing and by which said valve member may be accurately set with relation to the flow passageway through the chute in the housing.

The invention is illustrated by way of example in the accompanying drawings, in which.

Figure 1:
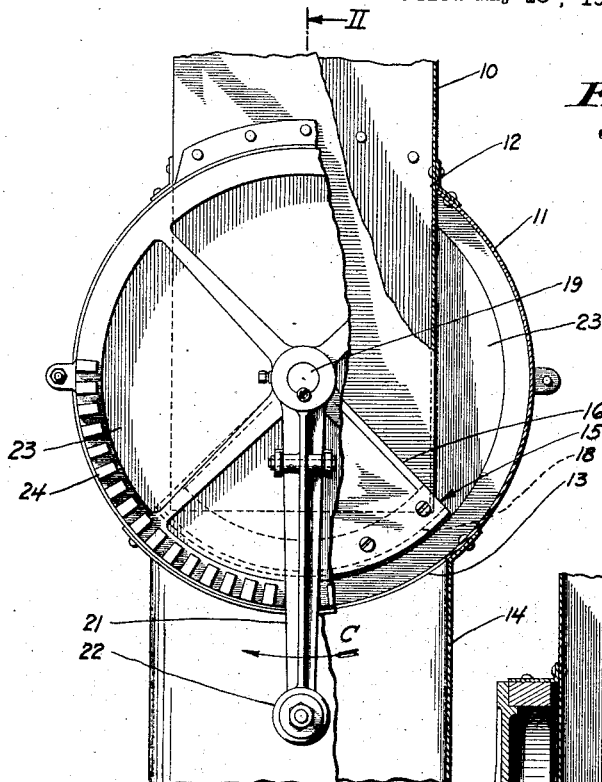
Fig. 1 is an enlarged fragmentary view in side elevation with parts broken away to more clearly disclose the operation of the valve member.

Referring more particularly to the drawings, 10 indicates a feed chute in communication with any suitable source of supply of granular or other bulk material adapted to flow through said chute. Mounted on the end of said feed chute is a cylindrical gate housing 11. The central axis of this housing extends transversely of the longitudinal axis of the chute and intersects the same. The cylindrical housing has an opening 12 in its uppermost side wall through which the chute 10 extends. This chute, as shown in the drawings, is rectangular in section, although other sectional formations might be suitable.

The lower end of the chute 10 which passes through the opening 12 in the housing extends a distance within the housing substantially equal to the diameter of the housing and terminating near an outlet opening 13 in the lowermost side of the housing 11. An outlet chute 14 is in communication with said opening and carries away the granular material which flows downwardly through the feed chute 10 into the housing 11 and out through the opening 13.

Figure 2:
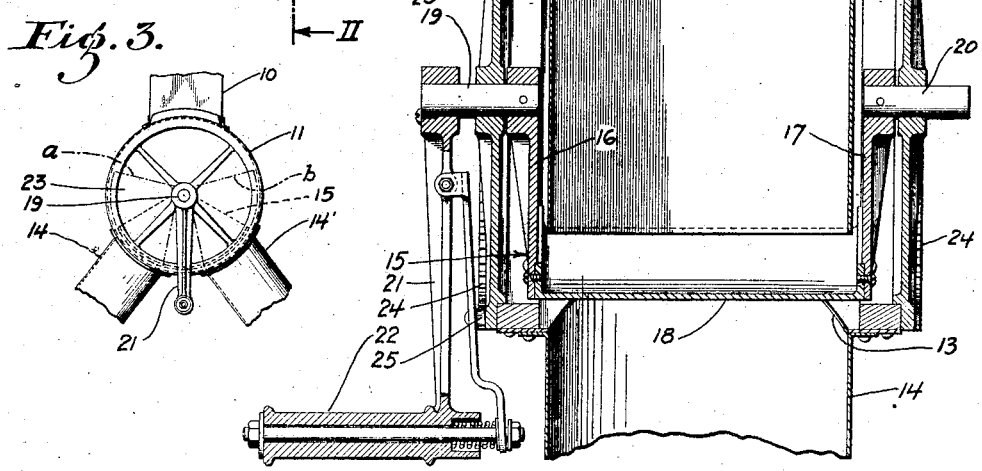
Fig. 2 is a view in central vertical section through the device as seen on line 2—2 of Fig. 1.

The flow of material is controlled by a segmental gate structure 15. This gate as shown in Fig. 2 of the drawings is formed with a pair of end segments 16 and 17 upon which is mounted an arcuate shell 18 forming the valve portion of the gate. The chord of the arc described by the shell 18 is slightly longer than the width of the feed chute 10, so that when the gate is in its lowermost position as indicated in Fig. 1 of the drawings, the gate will be disposed directly beneath the outlet mouth of the feed chute 10 and will close the same.

Referring again to Fig. 2 of the drawings, it will be seen that the end segments 16 and 17 of the gate are disposed along opposite sides of the feed chute 10 and are free to swing parallel thereto upon aligned trunnions 19 and 20. These trunnions are so positioned as to insure that the shell plate 18 of the gate may swing beneath the mouth of the chute 10 along a path of travel concentric with an arc which would intersect the edges of the lowermost ends of the chute 10.

Mounted on one of the trunnions 19 or 20 is an operating lever 21. This lever has a crank handle 22 by which the lever and the gate structure 15 may be caused to oscillate around the axis of the trunnions 19 and 20. This movement will bring about varying degrees of obstruction of the mouth of the chute 10 by the subjacent gate shell 18, and will thus vary the quantity flow of material from the chute 10 and into the lower chute 14.

The ends of the housing 11 are closed by heads 23 which are formed with bearings for receiving the trunnions 19 and 20 and are also formed with serrated segments 24 receiving a catch member 25 by which the crank 21 may be adjustably set, and the gate 15 thus disposed at various angles of adjustment relative to the mouth of the chute 10. In this manner the sugar gate may be adjusted to a nicety so that any desired amount of granular material may flow from the chute 10 and into the chute 14. This adjusting structure may also be used to hold the gate in its obstructing position directly beneath the chute 10 to prevent the flow of material.

Figure 3:
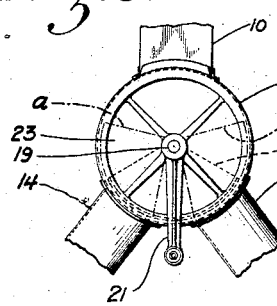
Fig. 3 is a view in elevation showing an application of the invention where material is to be diverted from one passageway to another.

Referring to Fig. 3 of the drawing, it will be seen that feed chute 10 is arranged to communicate with chutes 14 and 14'. The flow of material may be alternately controlled to either of the chutes 14 or 14' by swinging the gate from one dotted line position indicated at —a— to another dotted line position indicated at —b—, in which event one of the receiving chutes will be closed and the other one open to a varying control degree.

In operation of the present invention it will be understood that the device is assembled substantially as shown in the drawings, and that granular material is being delivered through the feed chute 10 to a receiving chute 14. In the event that the flow is to be completely interrupted, the gate 15 is swung to the position shown in Fig. 1 of the drawings. This will completely obstruct the mouth of the chute 10 and while the shell member 18 does not tightly fit against this mouth to prevent the flow of material, yet the overlapping edges of the sugar gate both at the ends of the shell 18 and along the sides of the segment 16 and 17 will act to form restricted passageways by which the granular material will be banked to completely choke the outlet mouth of the spout.

In the event that a flow of material is desired from the chute 10 to the receiving chute 14, the crank 21 may be swung in the direction of the arrow —c— after the catch member 25 has been withdrawn from register with one of the serrations in the segment 24. This will permit the crank to swing freely around its axis and will thus dispose the gate at a desired angle and to a position which will uncover the mouth of the chute 10 a desired amount. This, as will be readily understood, will permit the granular material to flow through the opening thus formed and will thereby determine and control the rate of flow of the material from the chute 10 into the chute 14.

When a desired adjustment of the gate has been made, the gate may be temporarily set in this position by releasing the catch member 25 and thus allowing its mechanism to thrust it into one of the serrations of the member 24 so that the lever arm of the gate will be temporarily locked. In the form of the invention shown in Fig. 3 it is intended to divert the flow from chutes 14 and 14' or vice-versa, and to at the same time control the flow of material from the chute 10 into either of said chutes.

It will thus be seen that with the device here disclosed it is possible to accurately and simply regulate the amount of material flowing through the pipe 10 and to divert this flow as convenience dictates.

While we have shown the preferred form of our invention as now known to us, it is to be understood that various changes may be made in its construction without departing from the spirit of the invention as defined in the appended claim.

Having thus described our invention, what we claim and desire to secure by Letters Patent is:

A control gate comprising a vertically disposed feed chute having a squared end in a plane at right angles to the longitudinal axis of the chute, a cylindrical housing mounted on the end of said feed chute, the axis of the housing extending transversely of the longitudinal axis of the chute and intersecting the same, said chute extending within the housing and substantially across the diameter of the housing, said housing having an outlet opening opposite the end of the chute, head members at opposite ends of said housing, horizontally disposed trunnions journalled at the center of said head members and projecting within the housing, a pair of end segments disposed one at each end of the housing interiorly thereof, said end segments secured to said trunnions whereby they will swing in concentric relation to said housing, an arcuate valve plate extending between the ends of said segmental end members and normally positioned over the open end of said feed chute, said valve plate having a chord slightly longer than the diameter of the feed chute, the mounting of said end members permitting said valve plate to be swung in concentric relation to the housing over the end of said feed chute, a serrated segment secured exteriorly of one of said head members, a crank arm secured on one of said trunnions exteriorly of the housing and said serrated segment, a spring-pressed catch carried by said crank arm engageable with said serrated segment whereby said valve structure may be placed and retained in a selected position relative to the open end of said chute.

LOUIS L. EDMUNDS.
JOHN C. ANDERSEN.